(12) United States Patent
Laigle et al.

(10) Patent No.: US 11,686,236 B1
(45) Date of Patent: Jun. 27, 2023

(54) DEVICE FOR THE REDUCTION OF AMMONIA AND NITROGEN OXIDES EMISSIONS

(71) Applicant: SAUDI ARABIAN OIL COMPANY, Dhahran (SA)

(72) Inventors: Emmanuel Laigle, Courbevoie (FR); Christophe Chaillou, Rueil-Malmaison (FR); Caroline Norsic, Rueil-Malmaison (FR); André Nicolle, Nanterre (FR)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/651,700

(22) Filed: Feb. 18, 2022

(51) Int. Cl.
*F01N 3/30* (2006.01)
*F01N 3/021* (2006.01)
(Continued)

(52) U.S. Cl.
CPC ............ *F01N 3/30* (2013.01); *B01D 46/0035* (2013.01); *B01D 53/0438* (2013.01); *B01D 53/9454* (2013.01); *B01D 53/9477* (2013.01); *B01D 53/9481* (2013.01); *B01D 53/9495* (2013.01); *F01N 3/021* (2013.01); *F01N 3/101* (2013.01); *F01N 3/2013* (2013.01); *F01N 3/2803* (2013.01); *F01N 9/00* (2013.01); *B01D 2253/108* (2013.01); *B01D 2255/904* (2013.01);
(Continued)

(58) Field of Classification Search
CPC .... F01N 13/009; F01N 2610/02; F01N 3/035; F01N 2370/04; F01N 2510/063; F01N 3/0807; F01N 3/0814; F01N 3/101; F01N 3/103; F01N 3/2066; F01N 3/2073; F01N 13/0093; F01N 13/011; F01N 2240/12; F01N 2240/25; F01N 2250/12; F01N 2570/12; F01N 2570/14; F01N 2570/18; F01N 3/0821; F01N 3/0871; F01N 3/20; F01N 3/2006; F01N 3/206; F01N 3/208; F01N 5/02; F01N 9/00
See application file for complete search history.

(56) References Cited

U.S. PATENT DOCUMENTS

| 5,782,087 A | 7/1998 | Kinugasa et al. |
| 7,371,353 B2 | 5/2008 | Robel et al. |
| (Continued) | | |

*Primary Examiner* — Anthony Ayala Delgado
(74) *Attorney, Agent, or Firm* — Osha Bergman Watanabe & Burton LLP (57) ABSTRACT

An exhaust gas purifying system for an engine includes a three-way catalyst, a particulate filter, an ammonia sorbent unit, an exhaust gas purifying catalyst unit, and a gas injection component including an oxygen-containing gas, all coupled to an exhaust line. Methods for purifying exhaust gas from an engine include exposing the exhaust gas to a three-way catalyst and a particulate filter, thus generating ammonia. The ammonia may be stored in an ammonia sorbent unit during a cold start condition. An oxygen-containing gas may be injected into the exhaust line. Once the ammonia sorbent has reached a desorption temperature, the ammonia may be released into the exhaust line and exposed to an exhaust gas purifying catalyst unit. The exhaust gas purifying catalyst partially oxidizes the ammonia to nitrous oxides (NOx) and subsequently catalyzes a reaction between the remaining ammonia and the nitrous oxides to give nitrogen gas and water.

20 Claims, 7 Drawing Sheets

(51) Int. Cl.
 *F01N 3/28* (2006.01)
 *F01N 3/20* (2006.01)
 *F01N 9/00* (2006.01)
 *B01D 53/94* (2006.01)
 *B01D 53/04* (2006.01)
 *B01D 46/00* (2022.01)
 *F01N 3/10* (2006.01)

(52) U.S. Cl.
 CPC .. *B01D 2255/911* (2013.01); *B01D 2257/406* (2013.01); *B01D 2259/4566* (2013.01); *B01D 2279/20* (2013.01); *F01N 2370/04* (2013.01); *F01N 2900/1602* (2013.01)

(56) References Cited

U.S. PATENT DOCUMENTS

| | | |
|---|---|---|
| 7,490,466 B2 | 2/2009 | Robel et al. |
| 8,381,512 B2 | 2/2013 | Brinkman et al. |
| 8,393,140 B2 | 3/2013 | Perry et al. |
| 10,173,173 B2 | 1/2019 | Andersen et al. |
| 10,807,081 B2 | 10/2020 | Larsson et al. |
| 11,448,111 B2 * | 9/2022 | Maertens ................. F01N 3/101 |
| 2006/0140833 A1 | 6/2006 | Morita et al. |
| 2011/0182791 A1 * | 7/2011 | Fedeyko ................... B01J 23/42 |
| | | 422/171 |
| 2015/0192049 A1 | 7/2015 | Suzuki et al. |
| 2016/0312675 A1 * | 10/2016 | Liu ....................... F01N 3/0237 |

* cited by examiner

DEVICE FOR THE REDUCTION OF AMMONIA AND NITROGEN OXIDES EMISSIONS

BACKGROUND

Environmental concerns and government regulations have led to efforts focused on improving the removal of noxious combustion by-products and exhaust pollutants from vehicle engine exhaust gases. Common exhaust lines are equipped with several components in order to reduce pollutants from the high concentrations observed directly from the engine to low concentrations at the tailpipe. Presently, a catalyst to treat gaseous pollutants including carbon monoxide (CO), nitrogen oxides (NOx), and unburned hydrocarbons (HC) as well as a particulate filter to collect and burn solid pollutants such as soot are included on vehicle exhaust lines. For example, commonly used three-way catalysts comprise precious metals to efficiently convert exhaust gas pollutants to harmless components including water ($H_2O$), nitrogen ($N_2$), and carbon dioxide ($CO_2$).

However, three-way catalysts often fully reduce NOx to ammonia ($NH_3$), another harmful gaseous pollutant. Additionally, a large portion of the exhaust emissions are produced during the cold start phase, resulting from the low conversion efficiency of many exhaust gas purifying catalysts in cold conditions. As such, catalysts such as three-way catalysts are often heated during the cold start phase to increase pollutant conversion and reduce noxious emissions. Nevertheless, under cold start conditions, residual pollutants may remain, making the removal of such pollutants a highly desirable goal.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an exhaust gas purifying system for an engine including a three-way catalyst coupled to an exhaust line, a particulate filter coupled to the exhaust line downstream of the three-way catalyst, an ammonia sorbent unit coupled to the exhaust line downstream of the particulate filter, an exhaust gas purifying catalyst unit coupled to the exhaust line downstream of the ammonia sorbent, and a gas injection component coupled to the exhaust line downstream of the particulate filter, the gas injection component including an oxygen-containing gas.

In another aspect, embodiments disclosed herein relate to a method for purifying exhaust gas including exposing exhaust gas from a combustion engine to a three-way catalyst and a particulate filter coupled to an exhaust line to generate ammonia, storing the ammonia in an ammonia sorbent unit during a cold start condition of the combustion engine, injecting an oxygen-containing gas into the exhaust line of the combustion engine, releasing ammonia from the ammonia sorbent once an ammonia desorption temperature is reached; and exposing the oxygen-containing gas and the ammonia to an exhaust gas purifying catalyst unit wherein the exhaust gas purifying catalyst partially oxidizes the ammonia to nitrous oxides (NOx) and subsequently catalyzes a reaction between an amount of remaining ammonia and the nitrous oxides to give nitrogen gas and water.

Other aspects and advantages of the claimed subject matter will be apparent from the following description and the appended claims.

DETAILED DESCRIPTION

Emissions from stoichiometric or rich burn combustion engines are often subject to three-way catalysts on vehicle exhaust lines for efficient conversion to inert components such as water ($H_2O$), carbon dioxide ($CO_2$), and nitrogen ($N_2$). Generally, three-way catalysts require a temperature of 400° C. to operate effectively, thus hindering the conversion of gaseous pollutants during the cold start phase of an engine. As such, a large percentage of noxious emissions from exhaust lines are emitted during this phase. Additionally, ammonia ($NH_3$) is a common product of unwanted side reactions catalyzed by the active metals in three-way catalysts. Similar to the emissions of carbon monoxide (CO), nitrogen oxides (NOx), and hydrocarbon (HC) gases in cold start conditions, three-way catalysts often generate more $NH_3$ gas during a cold start phase.

As such, embodiments in accordance with the present disclosure generally relate to systems and methods for reducing the content of ammonia ($NH_3$) generated from a three-way catalyst on an exhaust line of an internal combustion engine. Systems and methods in accordance with the present disclosure may additionally relate to reducing emissions in cold start conditions. In particular, the concentration of gaseous pollutants including $NH_3$ and NOx during the cold start phase of an internal combustion engine may be reduced using the systems and methods disclosed herein. The systems of the present disclosure are applicable to any stoichiometric (gasoline) engine. The systems may also be used in the exhaust line of any conventional or hybrid vehicles.

Figure 1:
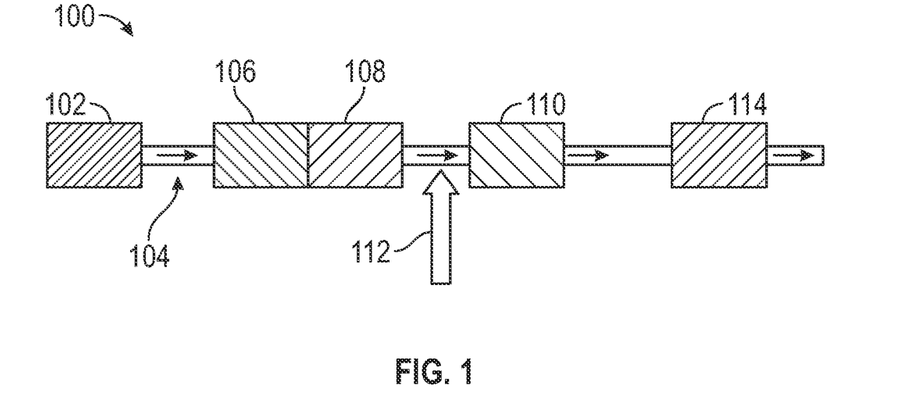
FIG. 1 is a schematic of an exhaust line including an exhaust gas purifying system in accordance with one or more embodiments of the present disclosure.

In one aspect, embodiments relate to an exhaust system that includes a three-way catalyst, a particulate filter, an ammonia sorbent unit, a gas injection component, and an exhaust gas purifying catalyst unit. As shown in FIG. 1, an exhaust gas purifying system 100 is placed on an exhaust line 104 of an internal combustion engine 102. The engine may be any suitable stoichiometric engine, such as those found in conventional and hybrid vehicles. Directly downstream of the engine 102 is a three-way catalyst 106 followed by a particulate filter 108. The three-way catalyst 106 and particulate filter 108 are not particularly limited. An ammonia sorbent unit 110, a gas injection component 112, and an exhaust gas purifying catalyst unit 114 are disposed downstream of the particulate filter 108.

In the systems of the present disclosure, the exhaust gas purifying catalyst unit 114 may be coupled to the exhaust line 104 downstream of the ammonia sorbent unit 110. In some embodiments, a gas injection component 112 may be coupled to the exhaust line 104 upstream of the ammonia sorbent unit 110. In other embodiments, the gas injection component 112 may be coupled to the exhaust line 104 downstream of the ammonia sorbent unit 110.

In one or more embodiments, exhaust gas from the engine 102 comprising CO, NOx, and HC may be passed through the three-way catalyst 106 first, and the particulate filter 108, second. In the exhaust line 104 downstream of the particulate filter 108, the exhaust gas may comprise $NH_3$, as generated by the three-way catalyst 106, as well as any residual CO, NOx, and HC. However, the content of CO, NOx, and HC may be lower in the exhaust line 104 downstream of the three-way catalyst 106 than in the exhaust line 104 directly downstream of the engine 102 (i.e., upstream of the three-way catalyst 106). The exhaust gas may then continue down the exhaust line 104, passing through the ammonia sorbent unit 110, next.

In one or more embodiments, the ammonia sorbent unit 110 may include a housing and a honeycomb sorbent body having a honeycomb structure. The honeycomb structure may include a monolith layer that supports a washcoat that increases the surface contact with the exhaust gas. The washcoat includes an active sorbent material. The active sorbent material is not particularly limited. In one or more embodiments, the active sorbent material is a zeolite, activated carbon, or a metal-organic framework. For example, in some embodiments, the active sorbent material may be a zeolite such as Cu-ZSM-5, Cu-β, Fe-β, $NH_4$-β, HY, 5A, and 13X, among others. The honeycomb structure of the ammonia sorbent unit 110 may be made from any suitable monolith including, but not limited to, cordierite, silicon carbide, metals, and metal alloys such as Fe—Cr—Al. The washcoat may be any washcoat commonly used in the art, such as alumina ($Al_2O_3$), $CeO_2$, $ZrO_2$, $La_2O_3$, $TiO_2$, or combinations thereof.

In cold start conditions, an ammonia sorbent unit 110 according to the exhaust gas purifying system 100 disclosed herein may adsorb the $NH_3$ gas that is produced by the three-way catalyst 106. In one or more embodiments, 100% of the $NH_3$ that is produced by the three-way catalyst 106 is adsorbed by the ammonia sorbent unit 110. During a cold start phase, the exhaust gas purifying catalyst unit 114 may not be at an operative temperature and therefore may not effectively remove $NH_3$ from the exhaust gas. Thus, the ammonia sorbent unit 110 coupled to the exhaust line 104 upstream of the exhaust gas purifying catalyst unit 114 in accordance with embodiments disclosed herein, provides for the adsorption of $NH_3$ to the active sorbent material of the ammonia sorbent unit 110 to reduce emissions through the exhaust line 104 during a cold start. The exhaust gas purifying catalyst unit 114 must be at or above a certain temperature, referred to as an activation temperature, to operate effectively (i.e., to convert $NH_3$ into harmless components such as $N_2$ and $H_2O$). The activation temperature of the exhaust gas purifying catalyst unit 114 may range from about 150 to 250° C. For example, depending on an active catalyst of the exhaust gas purifying catalyst unit 114, the activation temperature may have a range having a lower limit of any of 150, 160, 170, 180, 190, and 200° C., and an upper limit of any of 200, 210, 220, 230, 240, and 250° C., where any lower limit may be paired with any mathematically compatible upper limit.

Accordingly, suitable ammonia sorbent units 110 may have a desorption temperature, that is, a temperature at which the $NH_3$ is released from the sorbent, above 250° C. Ammonia desorption may occur at or above any of 250, 275, 300, 325, and 350° C.

The volume of the ammonia sorbent unit 110 in a given exhaust gas purifying system in accordance with the present disclosure may depend on multiple variables, such as the amount of $NH_3$ produced by the three-way catalyst of the system, the gas hourly space velocity of the three-way catalyst, and the efficiency required of the ammonia sorbent unit. In particular embodiments, a volume of the ammonia sorbent unit 110 may be based on a volume of the subject engine. For example, the ratio of ammonia sorbent unit 110 volume to engine volume may range from approximately 0.5:1 to 0.8:1. The ratio of ammonia sorbent unit 110 to engine volume may have a lower limit of any of, for example, 0.5:1, 0.55:1, 0.6:1, and 0.65:1, and an upper limit of any of 0.65:1, 0.7:1, 0.75:1, and 0.8:1, where any lower limit may be paired with any mathematically compatible upper limit.

As previously described, in one or more embodiments, an exhaust gas purifying catalyst unit 114 may be placed downstream of the ammonia sorbent unit 110. Following a cold start phase, once the exhaust gas purifying system 100 has warmed up, the $NH_3$ may be released from the ammonia sorbent unit 110. In other words, the ammonia sorbent unit 110 releases adsorbed $NH_3$ at a desorption temperature. The desorption temperature may be a function of sorbent loading. Once the exhaust gas purifying system 100 reaches the desorption temperature, $NH_3$ may be released from the ammonia sorbent unit 110 into the exhaust line 104. Given that the activation temperature of the exhaust gas purifying catalyst unit 114 may be lower than the desorption temperature of the ammonia sorbent unit 110, once the system 100 reaches a temperature sufficient for $NH_3$ desorption from the ammonia sorbent unit 110, the exhaust gas purifying catalyst unit 114 may be active and capable of treating the $NH_3$ that has been desorbed by the ammonia sorbent unit 110. For example, in one or more embodiments, the desorption temperature of the ammonia sorbent unit 110 may be 300° C. and the activation temperature of the exhaust gas purifying catalyst unit 114 may be between 150 and 250° C. Thus, once the exhaust gas purifying system 100 has warmed up to a temperature at or above 300° C., the exhaust gas purifying catalyst unit 114 is also active, and desorbed $NH_3$ may be converted to $N_2$ and $H_2O$ by the downstream exhaust gas purifying catalyst unit 114, as described in more detail below.

The exhaust gas purifying catalyst unit 114 of one or more embodiments may include a housing and a honeycomb catalyst body having a honeycomb structure. The honeycomb structure may be made of any suitable monolith, including cordierite, silicon carbide, metals, and metal alloys such as Fe—Cr—Al, among others. The monolith may support a washcoat that includes an active catalyst. The active catalyst may be any reactive metal capable of converting $NH_3$ into $N_2$ and $H_2O$ in the presence of oxygen. Examples of active catalysts include, but are not limited to, palladium (Pd), platinum (Pt), rhodium (Rh), nickel (Ni), iron (Fe), chromium (Cr), iridium (Ir), ruthenium (Ru), copper (Cu), and combinations thereof. The honeycomb structure may have any suitable washcoat, provided that it does not hinder the efficiency of the active catalyst.

The volume of the exhaust gas purifying catalyst unit 114 in a given system in accordance with the present disclosure may depend on multiple variables, such as the amount of $NH_3$ produced by the three-way catalyst 106 of the system 100, the gas hourly space velocity, the richness regulation, and the efficiency of the three-way catalyst 106. In particular embodiments, the volume of the exhaust gas purifying catalyst unit 114 may be based on the volume of the subject engine. For example, the ratio of exhaust gas purifying catalyst unit 114 volume to engine volume may range from approximately 0.2:1 to 0.8:1. The ratio of exhaust gas purifying catalyst unit 114 to engine volume may have a lower limit of any of, for example, 0.2:1, 0.25:1, 0.3:1, 0.35:1, 0.4:1, and 0.45:1 and an upper limit of any of 0.5:1, 0.55:1, 0.6:1, 0.65:1, 0.7:1, 0.75:1 and 0.8:1, where any lower limit may be paired with any mathematically compatible upper limit.

The exhaust gas purifying catalyst unit 114 as described above may convert $NH_3$ into $N_2$ and $H_2O$ in the presence of $O_2$ according to the following reactions, performed sequentially.

$$4NH_3 + 5O_2 \rightarrow 4NO + 6H_2O \quad \text{Eq. 1}$$

$$4NO + O_2 + 4NH_3 \rightarrow 4N_2 + 6H_2O \quad \text{Eq. 2}$$

A portion of the ammonia generated from the three-way catalyst 106 may react with oxygen to provide nitrogen oxide (NO) and water ($H_2O$), according to Equation 1. Subsequently, the produced NO may react with the remaining $NH_3$ and oxygen to yield $N_2$ and $H_2O$, shown by Equation 2. As such, the exhaust gas purifying catalyst unit 114 may convert $NH_3$ into inert gases.

As previously described, there may be residual NOx emissions in the exhaust line 104 downstream of the three-way catalyst 106. In one or more embodiments, the exhaust gas purifying catalyst unit 114 may catalyze a reaction between $NH_3$ and residual NOx according to Equation 2, to reduce NOx emissions at the tailpipe.

As described above, systems in accordance with embodiments disclosed herein may further include a gas injection component 112 that may inject an oxygen-containing gas into the exhaust line 104 to improve the efficiency of the exhaust gas purifying catalyst unit 114. For example, the gas injection component 112 may inject air or pure oxygen into the exhaust line 104 upstream of the exhaust gas purifying catalyst unit 114. In one or more embodiments, pure oxygen is injected into the exhaust line 104 by the gas injection component 112. The oxygen-containing gas must be injected at a higher pressure than the pressure of the exhaust line 104 to successfully enter the exhaust line 104. As such, the oxygen-containing gas may be compressed. In one or more embodiments, the oxygen-containing gas may be stored in a pressurized bottle before being injected into the exhaust line 104 via the gas injection component 112. For example, a pressurized bottle may include 1-10 liters of oxygen-containing gas.

Injection of an oxygen-containing gas may be regulated so as to provide the exhaust gas purifying catalyst unit 114 with an amount of oxygen ranging from 0.5 to 3% based on a total amount of gas (i.e., exhaust gas and oxygen-containing gas) in the exhaust line 104. In one or more particular embodiments, 1% oxygen may be supplied to the exhaust gas purifying catalyst unit 114. The amount of oxygen provided to the exhaust gas purifying catalyst unit 114 may be regulated according to various methods known in the art. For example, a lambda sensor may be installed in the exhaust line 104 downstream of the three-way catalyst 106 to monitor the amount of oxygen present in the exhaust line 104.

As previously described, unwanted side reactions of a three-way catalyst may produce $NH_3$ emissions. The instantaneous concentration of $NH_3$ in a tailpipe downstream of the three-way catalyst may range from about 80 to 150 mg/km (milligrams per kilometer). With an efficient exhaust gas purifying system 100 as described in the present disclosure, the instantaneous concentration of $NH_3$ at the tailpipe may be below 40 mg/km, below 30 mg/km, below 20 mg/km, or below 10 mg/km. In particular embodiments, the instantaneous concentration of $NH_3$ at the tailpipe downstream of an exhaust gas purifying system 100 may be 0 mg/km.

Figure 2:
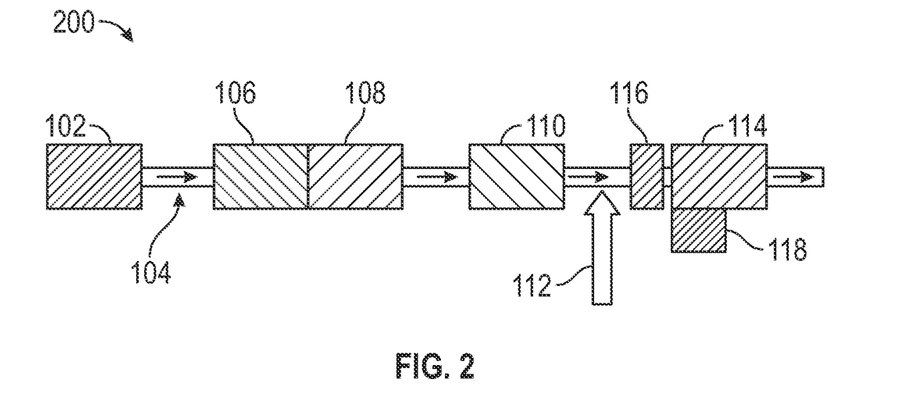
FIG. 2 is a schematic of an exhaust line including an exhaust gas purifying system in accordance with one or more embodiments of the present disclosure.

In some instances, in cold start conditions, it may be necessary to supply heat to the exhaust gas purifying catalyst unit 114. FIG. 2 shows an exhaust gas purifying system 200 in accordance with embodiments disclosed herein that includes a heater 116. In such embodiments, the heater 116 is placed upstream of the exhaust gas purifying catalyst unit 114 and downstream of a gas injection component 112, both the heater 116 and the gas injection component 112 placed downstream of the ammonia sorbent unit 110. The heater may be any type of heater, provided that the act of using the heater does not add pollutants to the exhaust gas. In particular embodiments, the heater 116 is an electrical heater. Exhaust gas purifying systems 200 that include a heater 116, may also include a temperature sensor 118 to determine the temperature of the exhaust gas purifying catalyst unit 114. The temperature sensor may be in operative communication with the heater 116. For example, in cold start conditions, the temperature sensor 118 may sense that the temperature of the exhaust gas purifying catalyst unit 114 is lower than the activation temperature of the exhaust gas purifying catalyst unit 114. The sensor 118 may then communicate this information with the heater 116, prompting the heater to turn on. This operative communication may result in rapid heating and activation of the exhaust gas purifying catalyst unit 114.

In embodiments in which a heater 116 is included in the exhaust gas purifying system 200, the heater 116 may heat to a temperature above the activation temperature of the exhaust gas purifying catalyst unit 114. For example, the heater 116 may heat the exhaust gas purifying catalyst unit 114 to a temperature at or above any of 250, 275, 300, 325, and 350° C.

Figure 3:
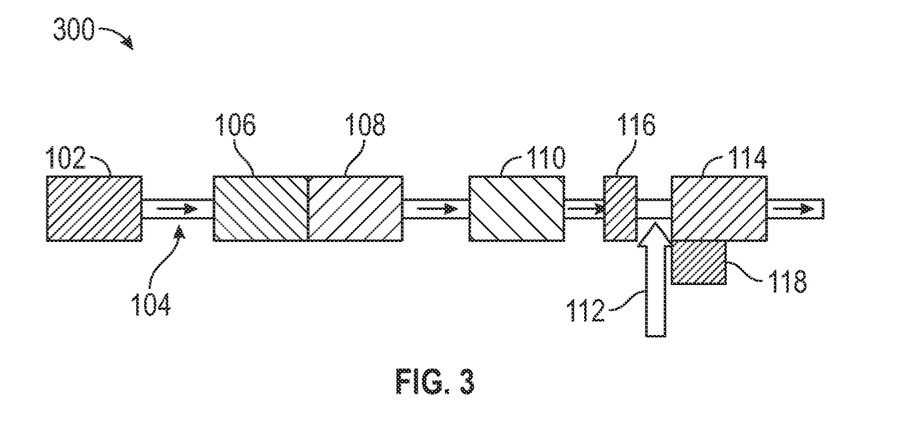
FIG. 3 is a schematic of an exhaust line including an exhaust gas purifying system in accordance with one or more embodiments of the present disclosure.

In addition to exhaust gas purifying systems 100 and 200, various other configurations of the ammonia sorbent unit 110, the gas injection component 112, the heater 116, and the exhaust gas purifying catalyst unit 114 disposed on the exhaust line 104 may be effective at reducing $NH_3$ emissions at the tailpipe in accordance with one or more embodiments of the present disclosure. For example, FIG. 3 shows an exhaust gas purifying system 300 in accordance with one or more embodiments disclosed herein. In exhaust gas purifying system 300, a heater 116 coupled to exhaust line 104 is directly downstream of an ammonia sorbent unit 110 and upstream of a gas injection component 112. Exhaust gas purifying catalyst unit 114 is disposed downstream of the gas injection component 112.

Figure 4:
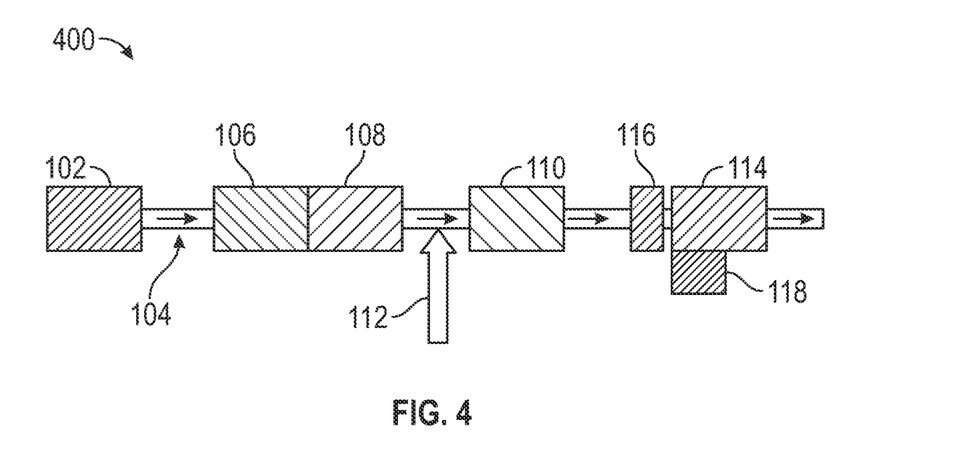
FIG. 4 is a schematic of an exhaust line including an exhaust gas purifying system in accordance with one or more embodiments of the present disclosure.
Figure 5:
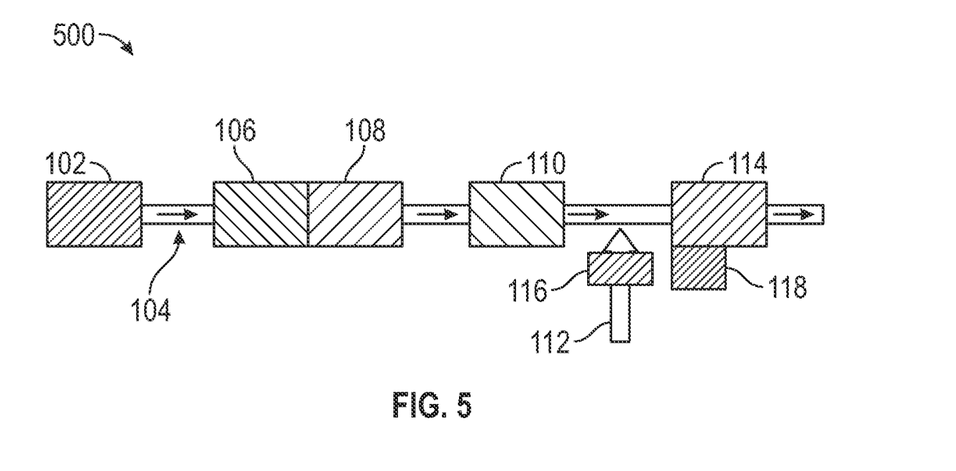
FIG. 5 is a schematic of an exhaust line including an exhaust gas purifying system in accordance with one or more embodiments of the present disclosure.

FIG. 4 shows another exhaust gas purifying system 400, in which a gas injection component 112 is directly downstream of a three-way catalyst 106 and particulate filter 108. Downstream of the gas injection component 112, an ammonia sorbent unit 110 is upstream of a heater 116, which is upstream of an exhaust gas purifying catalyst unit 114. Yet another embodiment of an exhaust gas purifying system 500 is shown in FIG. 5. In system 500, an ammonia sorbent unit 110 is upstream of a heater 116 that is combined with a gas injection component 112 to provide hot oxygen to exhaust line 104 and a downstream exhaust gas purifying catalyst unit 114.

As previously described, the instantaneous concentration of $NH_3$ in a tailpipe downstream of the three-way catalyst may range from about 80 to 150 mg/km. With efficient exhaust gas purifying system 200, 300, 400, and 500 including a heater 116 as described in the present disclosure, the instantaneous concentration of $NH_3$ at the tailpipe may be reduced to under 15 mg/km. In certain embodiments, exhaust gas purifying systems 200, 300, 400, and 500 including a heater 116 may reduce the concentration of $NH_3$ at the tailpipe to 0 mg/km.

Additionally, in cold start conditions, there may be residual NOx emissions in the exhaust line downstream of the three-way catalyst. In systems 200, 300, 400, and 500, including a heater 116 in accordance with one or more embodiments, the exhaust gas purifying catalyst unit 114 may reduce NOx emissions at the tailpipe during a cold start phase of an internal combustion engine.

In another aspect, embodiments of the present disclosure relate to methods for reducing $NH_3$ emissions at the tailpipe of an internal combustion engine using exhaust gas purifying systems as described above. In one or more embodiments, methods may include treating exhaust gas downstream of a three-way catalyst and a particulate filter. As previously described, downstream of the three-way catalyst (i.e., after being exposed to the three-way catalyst), the exhaust gas may include an increased concentration of $NH_3$ gas, as compared to upstream of the three-way catalyst.

Figure 6:
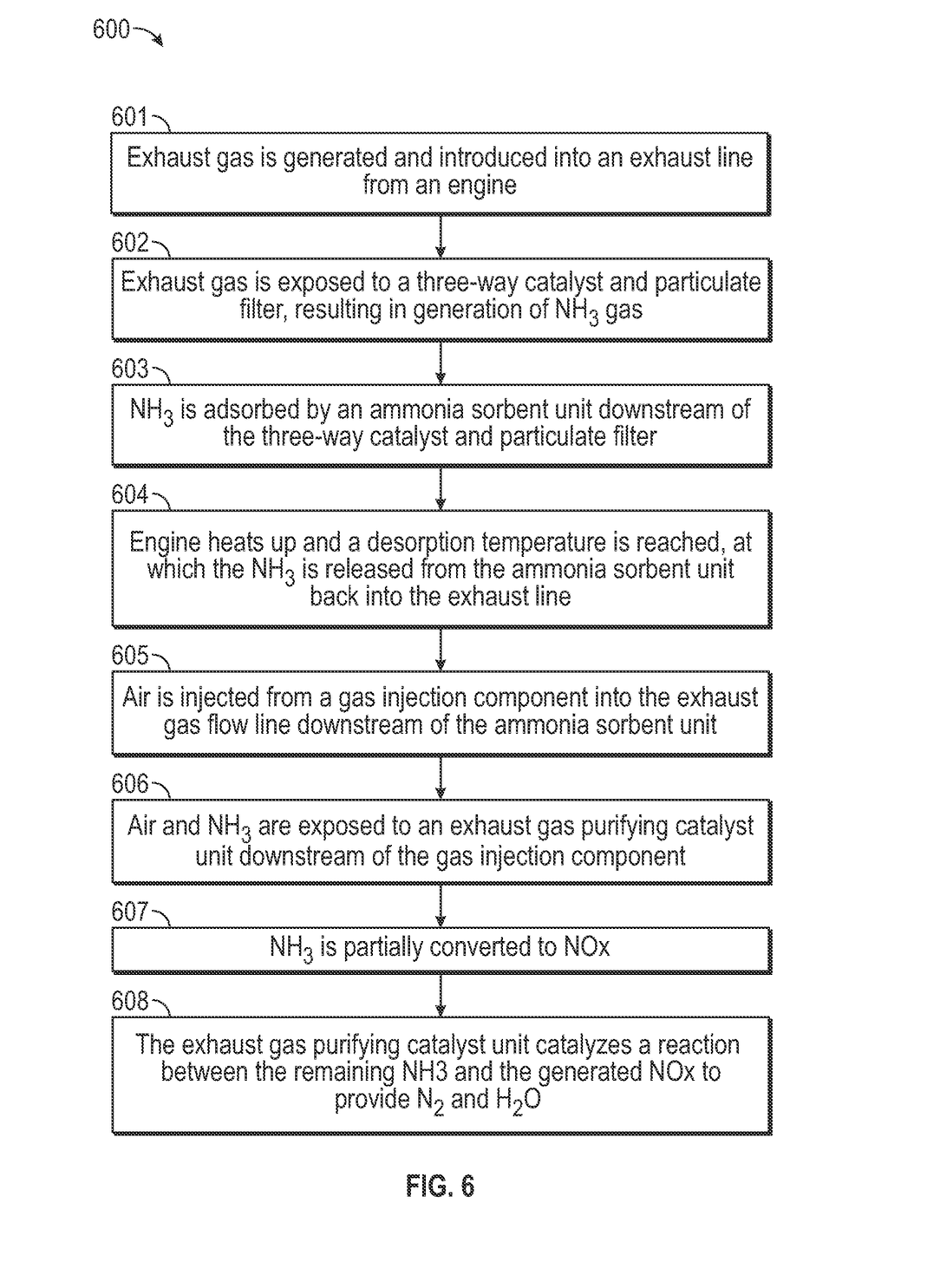
FIG. 6 is a block flow diagram of a method for reducing NH3 emissions at a tailpipe using an exhaust gas purifying system in accordance with the present disclosure.

A method 600 in accordance with one or more embodiments is shown as a block flow diagram in FIG. 6. First, exhaust gas is generated by an engine and thus, introduced into the exhaust line of the engine 601. The exhaust gas may include harmful emissions including CO, NOx, and HC. Downstream of the engine, the exhaust gas may be exposed to a three-way catalyst and a particulate filter, as is common in several conventional exhaust lines, with the goal of reducing the harmful emissions from the engine. Unwanted side reactions catalyzed by the three-catalyst may lead to the generation of $NH_3$ gas, shown at 602.

Next, the exhaust gas, now comprising $NH_3$, continues to travel through the exhaust line, and reaches an exhaust gas purifying system in accordance with the present disclosure. The exhaust gas is then exposed to an ammonia sorbent unit, by which the $NH_3$ is adsorbed 603. Once the engine, and therefore the exhaust line and its components, has warmed up, the $NH_3$ may be desorbed from the ammonia sorbent unit and returned to the exhaust line 604. Next, air may be injected into the exhaust line comprising the $NH_3$ with a gas injecting component 605. The air and $NH_3$ may then be exposed to an exhaust gas purifying catalyst unit disposed downstream of the gas injection component 606. The exhaust gas purifying catalyst unit may partially oxidize the $NH_3$ to nitrous oxides (NOx) 607 and subsequently catalyze a reaction between the remaining ammonia and the generated NOx to give $N_2$ and $H_2O$, shown at 608, as provided in Equations 1 and 2, above.

Although FIG. 6 shows air is injected into the exhaust line after the ammonia sorbent unit, air may be injected alternatively into the exhaust line before the ammonia sorbent unit in accordance with one or more methods disclosed herein, as discussed above with reference to FIG. 4.

In cold start conditions, methods may further include heating the exhaust gas purifying catalyst unit to an activation temperature so as to reduce $NH_3$ emissions even further. In such methods, the heating of the exhaust gas purifying catalyst unit may be regulated by a temperature sensor that is in fluid communication with the heater, as previously described. The heating of the exhaust gas purifying catalyst unit may include heating the exhaust before or as the exhaust enters the exhaust gas purifying catalyst unit or heating the air before or as the air is injected into the exhaust line after the ammonia sorbent unit.

Embodiments of the present disclosure may provide at least one of the following advantages. Exhaust gas purifying systems in accordance with the present disclosure may reduce $NH_3$ and NOx emissions at the tailpipe of an exhaust line from an internal combustion engine. In particular, the generation of gaseous pollutants during the cold start phase of a stoichiometric engine may be significantly reduced using the systems and methods disclosed herein.

EXAMPLES

Figure 7:
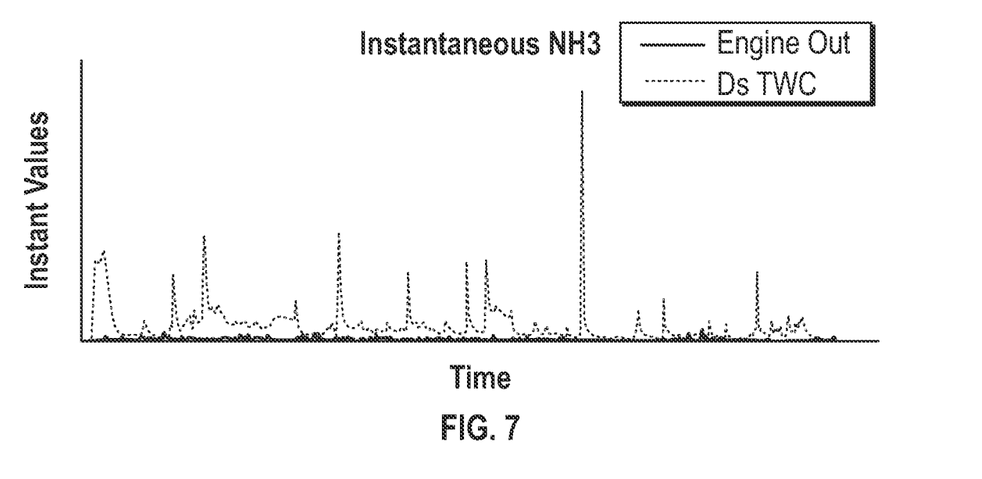
FIG. 7 is a graph of instantaneous values of $NH_3$ as a function of time (a) of emissions in the exhaust line directly downstream of a conventional internal combustion engine and (b) at the tailpipe, after emissions have been exposed to a three-way catalyst of a comparative example.

FIG. 7 shows the instantaneous concentration of $NH_3$ as a function of time (a) of emissions in the exhaust line directly downstream of an internal combustion engine, labelled as Engine out, and (b) at the tailpipe, after emissions have been exposed to a three-way catalyst, labelled as "Ds TWC" (Downstream three-way catalyst). The $NH_3$ emissions shown in FIG. 7 are representative of the $NH_3$ emissions of a conventional internal combustion engine containing only a three-way catalyst and particulate filter as exhaust gas purifying components. The instantaneous concentration of $NH_3$ directly downstream of an engine (i.e., Engine out values) are significantly lower than the instantaneous concentration of $NH_3$ downstream of a three-way catalyst (i.e., "Ds TWC" values) on the same exhaust line. With this comparison, it is clear that $NH_3$ is generated as a result of side reactions catalyzed by the three-way catalyst. Most of the NH$_3$ emissions occur during the cold start phase, although it appears that the three-way catalyst continues to generate NH$_3$ once it has been warmed up.

Figure 8:
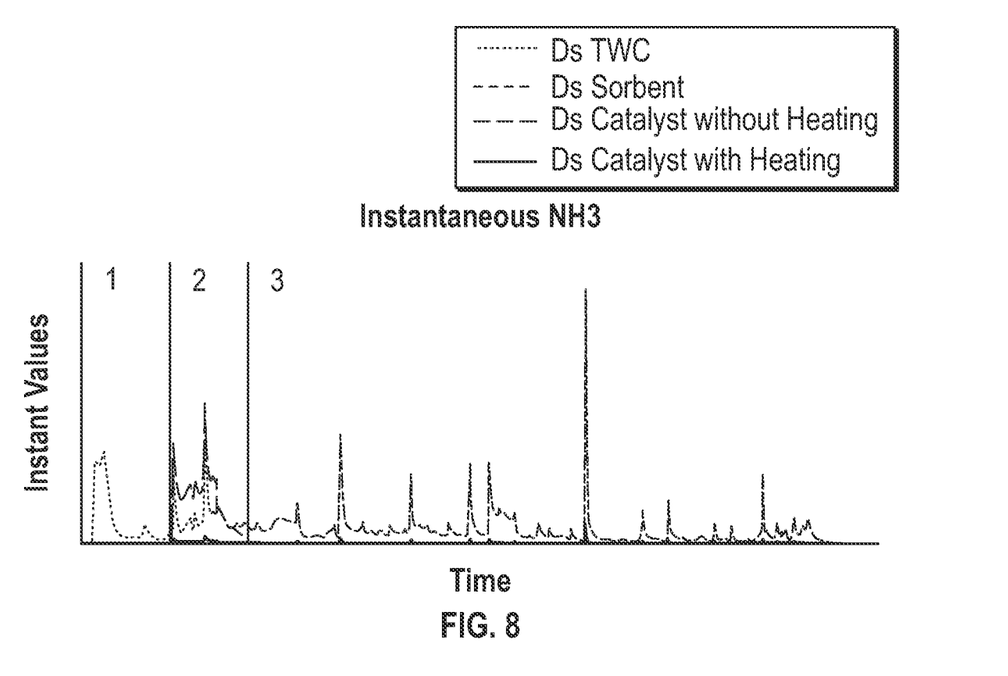
FIG. 8 is a graph of the instantaneous $NH_3$ emissions downstream of an exhaust gas purifying system (a) without heating and (b) with heating as a function of time in accordance with one or more embodiments of the present disclosure.

In contrast, when an exhaust gas purifying system in accordance with the present disclosure is placed on the exhaust line downstream of the three-way catalyst, NH$_3$ emissions at the tailpipe are reduced, as shown in FIG. 8. In FIG. 8, there are three sections that correlate to three different states of the exhaust gas purifying unit. Section 1 indicates the time and temperature before NH$_3$ desorption from an ammonia sorbent unit, section 2 indicates the time and temperature after NH$_3$ has desorbed from the ammonia sorbent unit but before the exhaust gas purifying unit has been activated, and section 3 indicates the time and temperature after the exhaust gas purifying catalyst unit has been activated. The instantaneous NH$_3$ emissions at each of the three states are provided for three example exhaust gas purifying systems in accordance with embodiments of the present disclosure and a control exhaust gas purifying system. The NH$_3$ emissions of the control exhaust gas purifying system are represented by "Ds TWC," meaning downstream three-way catalyst. Exhaust gas purifying system represented by "Ds sorbent," as shown, includes only an ammonia sorbent unit downstream of a three-way catalyst in accordance with embodiments of the present disclosure. NH$_3$ emissions of another embodiment exhaust gas purifying system are shown by the line labelled "Ds catalyst without heating," in which the gas purifying system contains an ammonia sorbent unit and a gas purifying catalyst unit downstream of a three-way catalyst. Another gas purifying system, "Ds catalyst with heating," is a system including an ammonia sorbent unit, a heater, and an exhaust gas purifying catalyst unit, both located downstream of a three-way catalyst.

In section 1 of FIG. 8, the instantaneous NH$_3$ emissions are significantly reduced by the addition of an ammonia sorbent unit downstream of the three-way catalyst, as demonstrated by all three exhaust gas purifying systems in accordance with one or more embodiments. In section 2, the systems Ds sorbent and Ds catalyst without heating release ammonia that is being desorbed from the ammonia sorbent unit to the tailpipe. By comparison, the Ds catalyst with heating system maintains minimal instantaneous ammonia concentration, as the exhaust gas purifying catalyst unit has already been heated to an activation temperature by the heater. This demonstrates the ability to significantly reduce NH$_3$ emissions in cold start conditions by including a heater. Further, both with and without heating, the NH$_3$ emissions after being passed through an exhaust gas purifying system in accordance with the present disclosure are significantly reduced compared to those downstream of a three-way catalyst alone or in combination with an ammonia sorbent unit.

Figure 9:
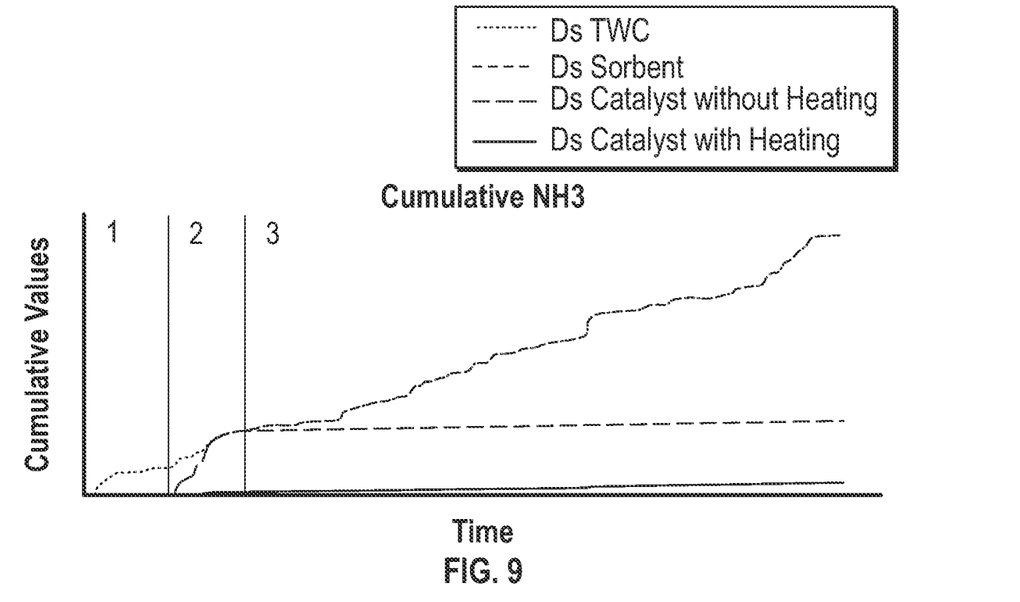
FIG. 9 is a graph of the cumulative $NH_3$ emissions of one control system and three exhaust gas purifying systems according to one or more embodiments of the present disclosure.

The efficiency of the system of one or more embodiments may be appreciated by the graph shown in FIG. 9. The graph includes the cumulative NH$_3$ emissions of a control system, "Ds TWC," in which the exhaust line of an internal combustion engine only contains a three-way catalyst for purification, and three exhaust gas purifying systems according to one or more embodiments. The first example exhaust gas purifying system includes a three-way catalyst and a downstream ammonia sorbent unit, labelled as "Ds sorbent." Whereas the NH$_3$ levels at a tailpipe remain low during the cold start phase in the Ds sorbent system, the total NH$_3$ emissions of the Ds sorbent system are the same as the control system, Ds TWC.

Cumulative NH$_3$ concentrations for two other example exhaust gas purifying systems in accordance with one or more embodiments, "Ds catalyst without heating," including an ammonia sorbent unit and exhaust gas purifying catalyst unit, and "Ds catalyst with heating," including an ammonia sorbent unit, a heater, and an exhaust gas purifying catalyst unit, are also provided in FIG. 9. The exhaust gas purifying system without heat, Ds catalyst without heating, may result in 70% lower NH$_3$ emissions than a system including a three-way catalyst alone. The exhaust gas purifying system with heat, Ds catalyst with heating, may result in a 95% reduction of NH$_3$ emissions at tailpipe.

Figure 10:
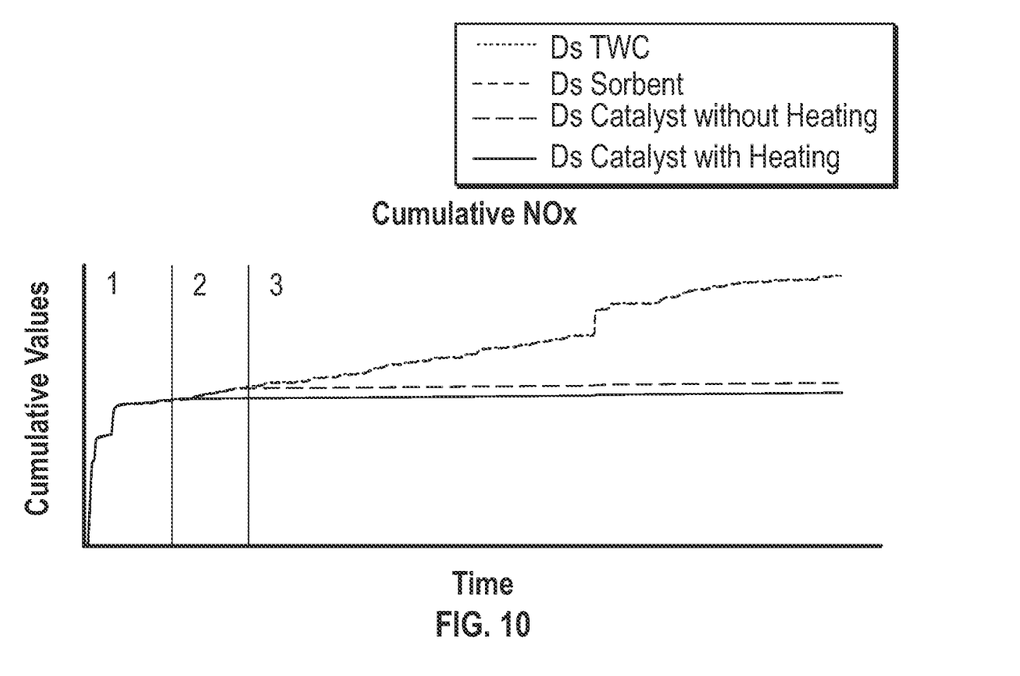
FIG. 10 is a graph of the cumulative NOx emissions of one control system and three exhaust gas purifying systems in accordance with one or more embodiments of the present disclosure.

An additional advantage of using exhaust gas purifying systems in accordance with the present disclosure is a reduction in residual NOx emissions at tailpipe. A graph including the cumulative NOx emissions of the same four systems described with reference to FIG. 9, one control system and three exhaust gas purifying systems in accordance with the present disclosure, is shown in FIG. 10. The total NOx emissions at the tailpipe of the control system, Ds TWC, and the first embodiment exhaust gas purifying system, Ds sorbent, are the same. The cumulative NOx emissions from the other example exhaust gas purifying systems, Ds catalyst without heating and Ds catalyst with heating, are significantly reduced. As can be seen in FIG. 10, exhaust gas purifying systems according to one or more embodiments of the present disclosure may result in a 40% decrease in NOx emissions at the tailpipe.

Figure 11:
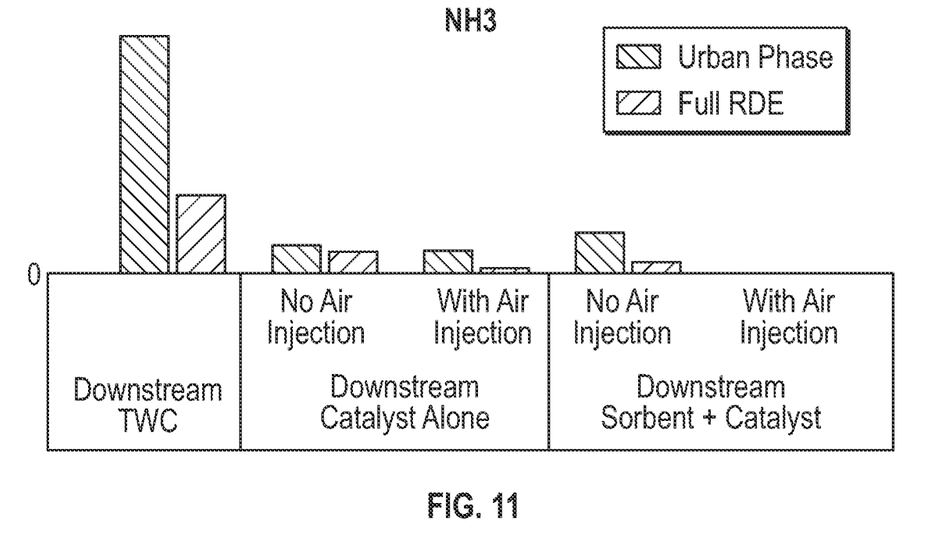
FIG. 11 is a graph of cumulative $NH_3$ emissions of exhaust gas purifying systems with and without gas injection in accordance with one or more embodiments of the present disclosure.
Figure 12:
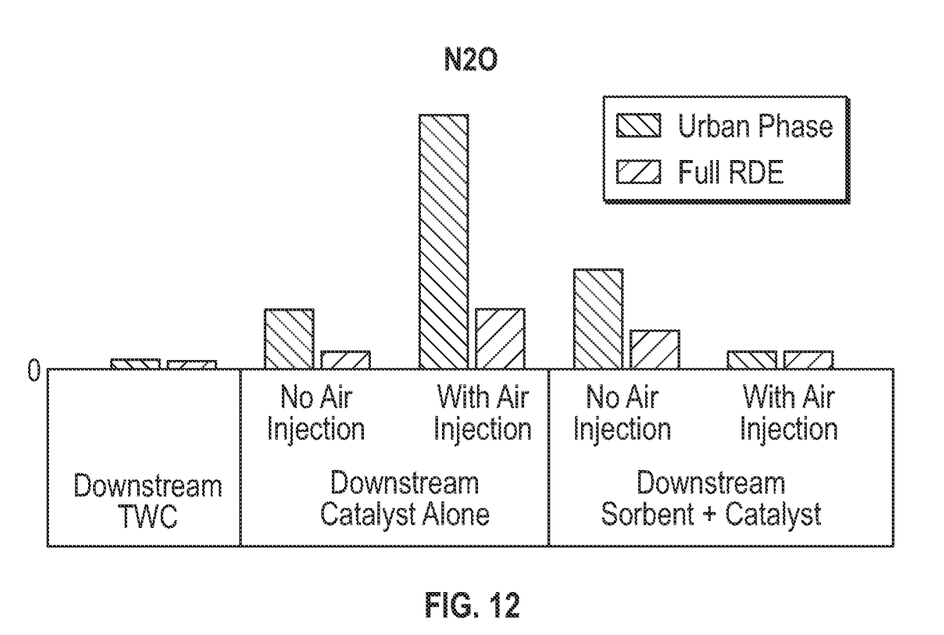
FIG. 12 is a graph of cumulative $N_2O$ emissions of exhaust gas purifying systems with and without gas injection in accordance with one or more embodiments of the present disclosure.
Figure 13:
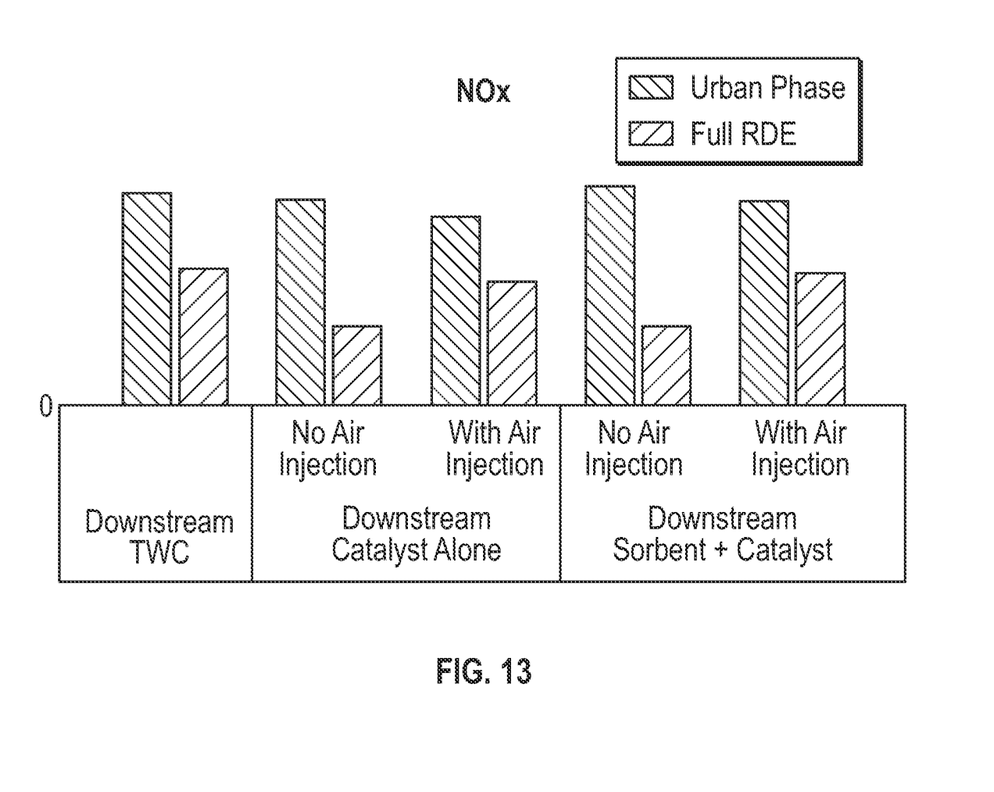
FIG. 13 is a graph of cumulative NOx emissions of exhaust gas purifying systems with and without gas injection in accordance with one or more embodiments of the present disclosure.

The increased conversion efficiency that is achieved by including a gas injection component in exhaust gas purifying systems of one or more embodiments can be appreciated by the graphs shown in FIGS. 11, 12, and 13. Five exhaust gas purifying systems are shown in each of the figures, one control system that only includes a three-way catalyst downstream of an internal combustion engine, and four example exhaust gas purifying systems in accordance with embodiments disclosed herein. The four example exhaust gas purifying systems will be referred to as systems 1, 2, 3, and 4. Systems 1 and 2 both contain an exhaust gas purifying catalyst unit downstream of the three-way catalyst, one does not have air injection (system 1) and the other has air injection (system 2). Systems 3 and 4 both contain an ammonia sorbent unit and an exhaust gas purifying catalyst unit downstream of the three-way catalyst, one does not have air injection (system 3) and the other has air injection (system 4). The systems are the same throughout FIGS. 10, 11, and 12. The efficiency of each system was tested by performing real driving emissions (RDE) cycles on an engine bench. Values for NH$_3$ (FIG. 11), N$_2$O (FIG. 12), and NOx (FIG. 13) were obtained during the urban phase of an RDE cycle and at full RDE. The urban phase of the RDE cycle refers to the first of three phases of an RDE cycle in which the efficiency is tested at a range of 0 to 60 km/h (kilometers per hour). The urban phase is the phase during which the exhaust gas purifying system is heating up, and as such, may be considered the phase resulting in a majority of emissions at the tailpipe. Full RDE refers to a complete RDE cycle which includes 3 phases: urban (0 to 60 km/h), road (60 to 100 km/h) and highway (above 100 km/h).

As shown in FIG. 11, the NH$_3$ emissions of the control system, at urban phase and full RDE, were significantly higher than NH$_3$ emissions of systems 1, 2, 3, and 4. The NH$_3$ emissions of systems 2 and 4, the systems including air injection, are further reduced from those without air injection, systems 1 and 3.

The emissions of nitrous oxide (N$_2$O), shown in FIG. 12, are more complicated than those of NH$_3$. N$_2$O emissions are increased in all embodiment systems (1, 2, 3, and 4) compared to the control system. When an exhaust gas purifying system in accordance with the present disclosure only includes an ammonia sorbent unit, air injection significantly increases the $N_2O$ emissions (1 vs. 2). Alternatively, $N_2O$ emissions of an exhaust gas purifying system including both an ammonia sorbent unit and an exhaust gas purifying catalyst unit are significantly decreased by the addition of injected air (3 vs. 4).

NOx emissions of all five example systems are shown in FIG. 13. While the incorporation of an exhaust gas purifying systems (without the addition of heat) in accordance with one or more embodiments of the present disclosure does not appear to provide significant NOx reduction during the urban phase, NOx reduction is achieved in the full RDE. In these embodiments, the injection of air into such systems may not be needed to achieve the reduction in NOx in the full RDE.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. An exhaust gas purifying system for an engine comprising:
   a three-way catalyst coupled to an exhaust line;
   a particulate filter coupled to the exhaust line downstream of the three-way catalyst;
   an ammonia sorbent unit coupled to the exhaust line downstream of the particulate filter;
   an exhaust gas purifying catalyst unit coupled to the exhaust line downstream of the ammonia sorbent unit; and
   a gas injection component coupled to the exhaust line downstream of the particulate filter, the gas injection component comprising an oxygen-containing gas.

2. The system of claim 1, wherein the ammonia sorbent unit comprises a honeycomb sorbent body with a honeycomb structure comprising an active sorbent material.

3. The system of claim 2, wherein the active sorbent material is a zeolite.

4. The system of claim 1, wherein a ratio of a volume of the ammonia sorbent unit to a volume of the engine is from 0.5:1 to 0.8:1.

5. The system of claim 1, wherein the exhaust gas purifying catalyst unit comprises a honeycomb catalyst body with a honeycomb structure comprising an active catalyst.

6. The system of claim 5, wherein the active catalyst is selected from the group consisting of palladium (Pd), platinum (Pt), rhodium (Rh), nickel (Ni), iron (Fe), chromium (Cr), iridium (Jr), ruthenium (Ru), copper (Cu), and combinations thereof.

7. The system of claim 5, wherein a ratio of a volume of the exhaust gas purifying catalyst unit to a volume of the engine is from 0.2:1 to 0.8:1.

8. The system of claim 1, wherein the oxygen-containing gas is oxygen.

9. The system of claim 1, further comprising a heater located downstream of the ammonia sorbent unit and upstream of the exhaust gas purifying catalyst unit.

10. The system of claim 9, wherein the heater is an electrical heater.

11. The system of claim 9, further comprising a temperature sensor for sensing a temperature of the exhaust gas purifying catalyst unit, wherein the temperature sensor is in operative communication with the heater.

12. A method for purifying exhaust gas comprising:
   exposing the exhaust gas from a combustion engine to a three-way catalyst and a particulate filter coupled to an exhaust line to generate ammonia;
   storing the ammonia in an ammonia sorbent unit during a cold start condition of the combustion engine, wherein the ammonia sorbent is downstream of the particulate filter;
   injecting an oxygen-containing gas into the exhaust line of the combustion engine, wherein the oxygen-containing gas is injected using a gas injection component that is downstream of the particulate filter;
   releasing the ammonia from the ammonia sorbent unit once an ammonia desorption temperature is reached; and
   exposing the oxygen-containing gas and the ammonia to an exhaust gas purifying catalyst unit disposed downstream of the ammonia sorbent, wherein the exhaust gas purifying catalyst unit partially oxidizes the ammonia to nitrous oxides (NOx) and subsequently catalyzes a reaction between an amount of remaining ammonia and the nitrous oxides to give nitrogen gas and water.

13. The method of claim 12, further comprising heating the exhaust gas purifying catalyst unit in cold start conditions to at least a catalyst activation temperature with a heater.

14. The method of claim 13, further comprising regulating the heating of the exhaust gas purifying catalyst unit by sensing a temperature of the exhaust gas purifying catalyst unit with a sensor that is in operative communication with the heater.

15. The method of claim 12, wherein a catalyst activation temperature is lower than the ammonia desorption temperature.

16. The method of claim 15, wherein the catalyst activation temperature is between 150 to 250° C.

17. The method of claim 12, wherein the injecting the oxygen-containing gas is regulated to provide an amount of 1% oxygen to the exhaust gas purifying catalyst unit.

18. The method of claim 12, wherein the ammonia generated from the three-way catalyst is present at a concentration ranging from 80 to 150 mg/km.

19. The method of claim 12, wherein the exhaust gas purifying catalyst unit comprises an active catalyst selected from the group consisting of palladium (Pd), platinum (Pt), rhodium (Rh), nickel (Ni), iron (Fe), chromium (Cr), iridium (Ir), ruthenium (Ru), copper (Cu), and combinations thereof.

20. The method of claim 12, wherein the ammonia sorbent unit comprises an active sorbent material that is a zeolite.

* * * * *